US008165063B2

(12) United States Patent
Kim et al.

(10) Patent No.: US 8,165,063 B2
(45) Date of Patent: Apr. 24, 2012

(54) SYSTEM AND METHOD FOR PERFORMING LOCATION MANAGEMENT USING HOME SUBSCRIBER SERVER IN VOIP SERVICE

(75) Inventors: Kwihoon Kim, Daejeon (KR); Hyun Woo Lee, Daejeon (KR); Seng Kyoun Jo, Seoul (KR); Won Ryu, Daejeon (KR)

(73) Assignees: Electronics and Telecommunications Research Institute, Daejeon (KR); KT Corporation, Seongnam (KR)

( * ) Notice: Subject to any disclaimer, the term of this patent is extended or adjusted under 35 U.S.C. 154(b) by 1243 days.

(21) Appl. No.: 11/864,048

(22) Filed: Sep. 28, 2007

(65) Prior Publication Data

US 2008/0080486 A1 Apr. 3, 2008

(30) Foreign Application Priority Data

Sep. 29, 2006 (KR) ........................ 10-2006-0096430

(51) Int. Cl.
*H04W 4/00* (2009.01)
*H04L 12/66* (2006.01)
*G06F 15/16* (2006.01)

(52) U.S. Cl. ..................... 370/328; 370/356; 455/432.1; 709/219

(58) Field of Classification Search .................. None
See application file for complete search history.

(56) References Cited

U.S. PATENT DOCUMENTS

| 6,654,606 | B1 * | 11/2003 | Foti et al. | 455/432.1 |
| 7,502,837 | B2 * | 3/2009 | Westman et al. | 709/219 |
| 2004/0148416 | A1 * | 7/2004 | Aarnos et al. | 709/230 |
| 2004/0177145 | A1 * | 9/2004 | Bajko | 709/225 |
| 2006/0084431 | A1 * | 4/2006 | Hua et al. | 455/433 |
| 2006/0140149 | A1 * | 6/2006 | Kim et al. | 370/331 |
| 2006/0242307 | A1 * | 10/2006 | Jung et al. | 709/227 |

FOREIGN PATENT DOCUMENTS

| KR | 1020040022663 A | 3/2004 |
| KR | 1020050078597 A | 8/2005 |
| KR | 1020050081928 A | 8/2005 |
| KR | 1020060044657 A | 5/2006 |
| KR | 1020060071067 A | 6/2006 |
| KR | 1020060074037 A | 7/2006 |
| KR | 1020060082123 A | 7/2006 |

\* cited by examiner

*Primary Examiner* — Melanie Jagannathan (57) ABSTRACT

Provided is a system and method for performing location management using a Home Subscriber Server (HSS) in a Voice over Internet Protocol (VoIP) service. The system includes a Session Initiation Protocol (SIP) terminal unit sending and receiving a SIP call, by which a VoIP telephone can be used, by being connected to a broadband VoIP network, an HSS controller having a Database (DB) storing an ID of a device which the SIP terminal unit initially accesses according to an access network to which the SIP terminal unit is connected in the broadband VoIP network, location information of the SIP terminal unit, which contains a location code and address of the device, and location information of a destination terminal to which the SIP terminal unit desires to connect, and a Call Session Control Function (CSCF) controller connecting the SIP terminal unit and the destination terminal in a VoIP telephone service using the location information stored in the HSS controller in the broadband VoIP network. Accordingly, a method of registering a location of a VoIP telephone and a location management service are provided, and a process of providing a short-distance call routing service in a representative number service, which is a location-based service, is suggested using the location registration method.

2 Claims, 6 Drawing Sheets

| SENDING TELEPHONE NUMBER | LOCATION INFORMATION (AREA CODE) | SERVICE PROVIDER | ACCESS NETWORK TYPE | ACCESS ID | ADDRESS |
|---|---|---|---|---|---|
| 07012341000 | 50 | H사 | ADSL | LINE NUMBER 1 | GAJUNG-DONG, DAEJUN |
| 07012342000 | 24 | K사 | WiBro | CELL ID 1 | SHINCHON1-DONG, SEOUL |
| 07012343000 | 24 | K사 | WiBro | CELL ID 1 | SHINCHON1-DONG, SEOUL |
| | | | | | |

FIG. 5

| SERVICE PROVIDER | ACCESS NETWORK TYPE | ACCESS ID | ACCESS COUNT | RECENTLY ACCESSED LOCATION INFORMATION 1 | RECENTLY ACCESSED LOCATION INFORMATION 2 | ... | RECENTLY ACCESSED LOCATION INFORMATION N |
|---|---|---|---|---|---|---|---|
| K사 | WLAN | (MAC ADDRESS OF AP) | 4 | 50 | 30 | ... | 46 |
| K사 | WiBro | (CELL ID OF RAS) | 1 | 24 | 24 | ... | 24 |
| K사 | HFC | (MAC ADDRESS OF CM) | 2 | 24 | 40 | ... | 36 |
| H사 | ADSL | (ADSL LINE NUMBER) | 3 | 46 | 46 | ... | 46 |

FIG. 6

| LOCATION INFORMATION (AREA CODE) | LOCAL DESTINATION NUMBER | DESCRIPTION |
|---|---|---|
| 1 | 070-1234-5555 | WOL-PYONG BRANCH, DAEJUN |
| 2 | 070-1234-7777 | JONGRO-2GA BRANCH, SEOUL |
| 3 | 070-1234-7777 | JONGRO-2GA BRANCH, SEOUL |
|  |  |  |

SYSTEM AND METHOD FOR PERFORMING LOCATION MANAGEMENT USING HOME SUBSCRIBER SERVER IN VOIP SERVICE

CROSS-REFERENCE TO RELATED PATENT APPLICATION

This application claims the benefit of Korean Patent Application No. 10-2006-0096430, filed on Sep. 29, 2006, in the Korean Intellectual Property Office, the disclosure of which is incorporated herein in its entirety by reference.

BACKGROUND OF THE INVENTION

1. Field of the Invention

The present invention relates to a communication system, and more particularly, to a system and method for performing location management using a Home Subscriber Server (HSS) in a Voice over Internet Protocol (VoIP) service.

2. Description of the Related Art

Location management in a conventional Public Switched Telephone Network (PSTN) or wireless network is accomplished using directory number information of wired telephones or location information of wireless telephones. The location management can be applied to various applications, such as searching for the closest subscriber in a certain area.

A new type of communication network is a Voice over Internet Protocol (VoIP) network. Most commercial VoIP telephone services are provided via a broadband VoIP network using cable modem or Digital Subscriber Line (DSL). It is also predicted that commercial VoIP telephone services will be provided to mobile subscribers via a Wireless Local Area Network (WLAN) or a Wireless Broadband (WiBro) network. A disadvantage of the broadband VoIP network is that there are a very few methods of performing location management in a VoIP service. Thus, the broadband VoIP network cannot provide a national representative number service, such as the 1588 service in R. O. Korea, based on location management.

A disclosed method is a method of performing location management by mapping a VoIP number to a telephone number in a wired network. This method cannot be used in a WLAN or WiBro network in which a terminal moves.

There is an easy method of directly inputting location information by a sender in an initial connection.

SUMMARY OF THE INVENTION

An aspect of the present invention is to provide sender information according to a location of a user in a broadband network without inputting location data fixed to the broadband network.

In order for a user to use a Voice over Internet Protocol (VoIP) telephone of a laptop computer used in home even via a Wireless Broadband (WiBro) network in out-of-door, it must be considered how sender location information of the user is provided.

In order to register a location, a method of registering a location with the least user operations considering a characteristic of each access network must be provided. Information to be used to perform location management in each network is as follows.

If an access network used by a sender in a broadband telephone network is Asymmetric Digital Subscriber Line (ADSL), information on a DSL line is used, and if the access network is a Hybrid Fiber Coaxial (HFC) cable, information on a Media Access Control (MAC) address of a Cable Modem (CM) is used as a key, if the access network is a WiBro network, a cell Identification (ID) of a Radio Access system (RAS) is used, and if the access network is a Wireless Local Area Network (WLAN), a MAC address of an Access Point (AP) is used. As described above, if the location management of a sending terminal is performed with information on a device which the sending terminal initially accesses, since it is predicted that a change of the accessed device will be much less than movement of the sending terminal, the number of location changes will be much more reduced. Since an ID of an initially accessed device is needed when the sending terminal requests authentication, the sending terminal can obtain location information of the initially accessed device.

Since an ID of each device is not frequently changed but has possibility of the change, each device must store information on an access location and needs to ask a user whether its address is correct.

Each access ID stored in a database (DB) of a location information providing server may be an access ID belonging to a service provider or another provider. If a suggested method is used, information on an access ID by which a sending terminal accesses can be obtained and transmitted regardless of service providers.

According to an aspect of the present invention, there is provided a system for performing location management using a Home Subscriber Server (HSS) in a Voice over Internet Protocol (VoIP) service, the system comprising: a Session Initiation Protocol (SIP) terminal unit sending and receiving a SIP call, by which a VoIP telephone can be used, by being connected to a broadband VoIP network; an HSS controller having a Database (DB) storing an ID of a device which the SIP terminal unit initially accesses according to an access network to which the SIP terminal unit is connected in the broadband VoIP network, location information of the SIP terminal unit, which contains a location code and address of the device, and location information of a destination terminal to which the SIP terminal unit desires to connect; and a Call Session Control Function (CSCF) controller connecting the SIP terminal unit and the destination terminal in a VoIP telephone service using the location information stored in the HSS controller in the broadband VoIP network.

The access network to which the SIP terminal unit is connected in the broadband VoIP network and the ID of the device which the SIP terminal unit initially accesses according to the access network may be a Wireless Local Area Network (WLAN) and a Media Access Control (MAC) address of an Access Point (AP), a Wireless Broadband (WiBro) network and a cell ID of a Radio Access system (RAS), a Hybrid Fiber Coaxial (HFC) cable and a MAC address of a Cable Modem (CM), or an Asymmetric Digital Subscriber Line (ADSL) and a line number.

The HSS controller may comprise: an HSS having a location information DB storing an ID of a device, which the SIP terminal unit initially accesses, and location information of the SIP terminal unit, which contains a location code and address of the device; a location information providing server having a location-based application DB storing location information of a destination terminal to which the SIP terminal unit desires to connect; and a location registration server receiving an address of the SIP terminal unit from the SIP terminal unit or the ID of the device which the SIP terminal unit initially accesses, and transmitting the address of the SIP terminal unit to the HSS.

According to another aspect of the present invention, there is provided a method of performing location management using a Home Subscriber Server (HSS) in a Voice over Internet Protocol (VoIP) service, the method comprising: (a)

directly receiving location information of a SIP terminal unit from the SIP terminal unit to the HSS or registering the location information of the SIP terminal unit from an ID of a device which the SIP terminal unit initially accesses to the HSS, in a broadband VoIP network; (b) the SIP terminal unit requesting a call from a SSW (CSCF: Call Session Control Function) using a representative number; (c) inquiring the location information of the SIP terminal unit registered in the HSS; and (d) transmitting the call request of the SIP terminal unit to a local destination number of a location corresponding to the representative number using the location information.

Operation (a) may comprise: (a-1) the SIP terminal unit confirming a type of an access network connected to the broadband VoIP network and the ID of the device which the SIP terminal unit initially accesses; (a-2) if the SIP terminal unit initially accesses the broadband VoIP network for the ID of the device confirmed in (a-1), directly receiving an address from the SIP terminal unit; (a-3) if the SIP terminal unit accesses the broadband VoIP network twice or more for the ID of the device confirmed in (a-1) receiving recently accessed location information registered in the HSS, and if the received location information is different from a currently accessed location, directly receiving an address from the SIP terminal unit; and (a-4) registering the address received in (a-2) or (a-3) in the HSS by mapping the address to the type of the access network and the ID of the device.

Operation (c) may comprise: (c-1) the SSW requesting a call from the HSS using the representative number; (c-2) the HSS inquiring sending location information of the SIP terminal unit; and (c-3) the HSS extracting a local destination number of a location corresponding to the representative number using the inquired sending location information.

Operation (d) may comprise: (d-1) the SSW requesting a call from a destination terminal corresponding to the local destination number; and (d-2) if a VoIP service between the destination terminal and the SIP terminal unit is connected, the destination terminal receives the location information of the SIP terminal unit from the HSS.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will be described in detail by explaining preferred embodiments of the invention with reference to the attached drawings.

Figure 1:
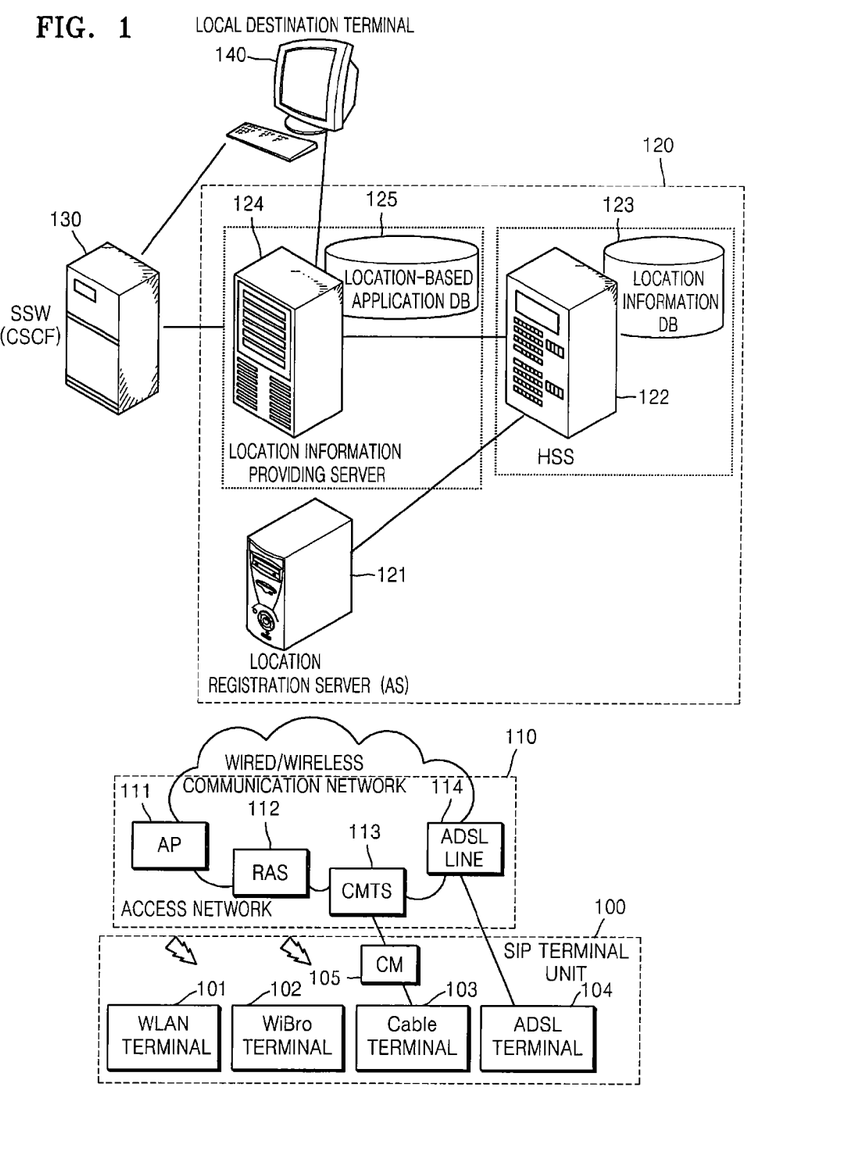
FIG. 1 is a configuration of a Voice over Internet Protocol (VoIP) service system according to an embodiment of the present invention.

FIG. 1 is a configuration of a Voice over Internet Protocol (VoIP) service system according to an embodiment of the present invention. Referring to FIG. 1, the VoIP service system includes a Session Initiation Protocol (SIP) terminal unit 100, an access network 110, a Home Subscriber Server (HSS) controller 120, a Call Session Control Function (CSCF) controller 130, and a local destination terminal 140.

The SIP terminal unit 100 can send and receive a SIP call, which is assumed as Wireless Local Area Network (WLAN), Wireless Broadband (WiBro), Cable, or Asymmetric Digital Subscriber Line (ADSL) terminal 101, 102, 103, or 104 according to access network 110. Each terminal may be a soft phone type or a hard Internet Protocol (IP) phone type.

In order to transmit or receive a packet, the WLAN terminal 101 accesses an Access Point (AP) 111, the WiBro terminal 102 accesses a Radio Access system (RAS) 112, the Cable terminal 103 accesses a Cable Modem Termination System (CMTS) 113 via a Cable Modem (CM) 105, and the ADSL terminal 104 accesses an ADSL line 114.

As a destination terminal, the local destination terminal 140 is assigned in a short distance from a sender.

As a network device, the CSCF controller 130 routes a VoIP call.

As a device related location information, the HSS controller 120 includes a location registration server 121 for registering a location, a location information providing server 124 providing destination location information, a location-based application Database (DB) 125 providing stored information to a location-related application, an HSS 122 managing integrated data, and a location information DB 123 providing location registration information.

Figure 2:
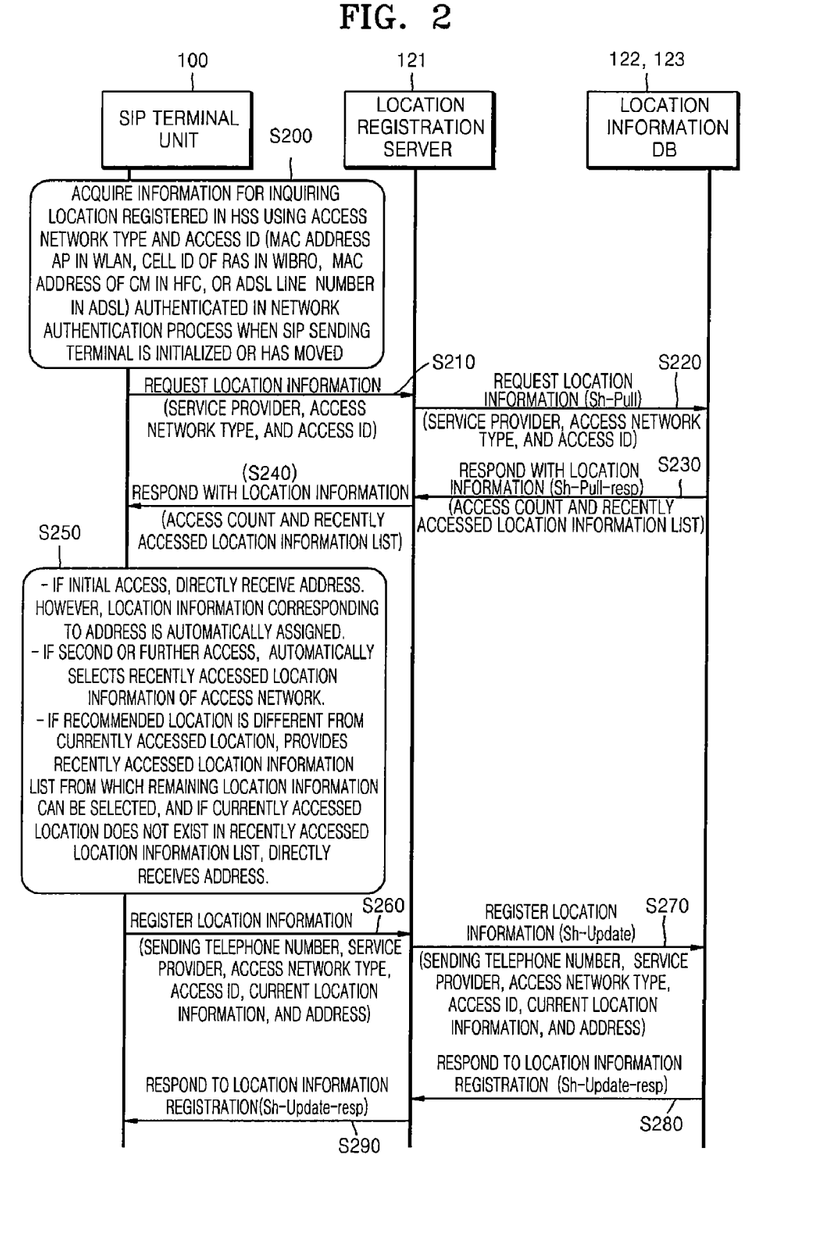
FIG. 2 is a signaling diagram of a process of registering a location of a VoIP sender according to an embodiment of the present invention.

FIG. 2 is a signaling diagram of a process of registering a location of a VoIP sender according to an embodiment of the present invention.

Referring to FIG. 2, in operation S200, the SIP terminal unit 100 acquires information for inquiring a location registered in the HSS 122 using an access network type and an access ID (a Media Access Control (MAC) address of an AP in WLAN, a cell ID of a RAS in WiBro, a MAC address of a CM in HFC cable, or an ADSL line number in ADSL) authenticated in a network authentication process when the SIP terminal unit 100 is initialized or has moved.

In operations S210 and S220, the SIP terminal unit 100 requests location information from the HSS 122 via the location registration server 121 in order to determine whether location information registered in the current access ID exists. Parameters used for the location information request are a service provider, an access network type, and an access ID. Since every service providers can independently have an access ID policy according to an access network type, the parameters are selected. However, it is assumed that a service provider does not repeatedly provide the same access ID for the same access network type.

The HSS 122 provides a location information response to the SIP terminal unit 100 via the location registration server 121 in operations S230 and S240. In this case, the HSS 122 provides the number of accesses to the access network and a recently accessed location information list to the SIP terminal unit 100.

If the SIP terminal unit 100 initially accesses a corresponding access network, the SIP terminal unit 100 directly receives an address. However, location information corresponding to the address is automatically assigned. In operation S250, if the SIP terminal unit 100 accesses the access network twice or more, recently accessed location information of the access network is automatically selected. However, if the selected location is different from a currently accessed location, a recently accessed location information list from which remaining location information can be selected is provided, and if the currently accessed location does not exist in the recently accessed location information list, the address is directly received.

The SIP terminal unit 100 requests location information registration of the selected location information from the HSS 122 via the location registration server 121 in operations S260, S270, S280, and S290. In this case, the current location information and address are registered with respected to a sending telephone number, the access network type, and the access ID.

Figure 3:
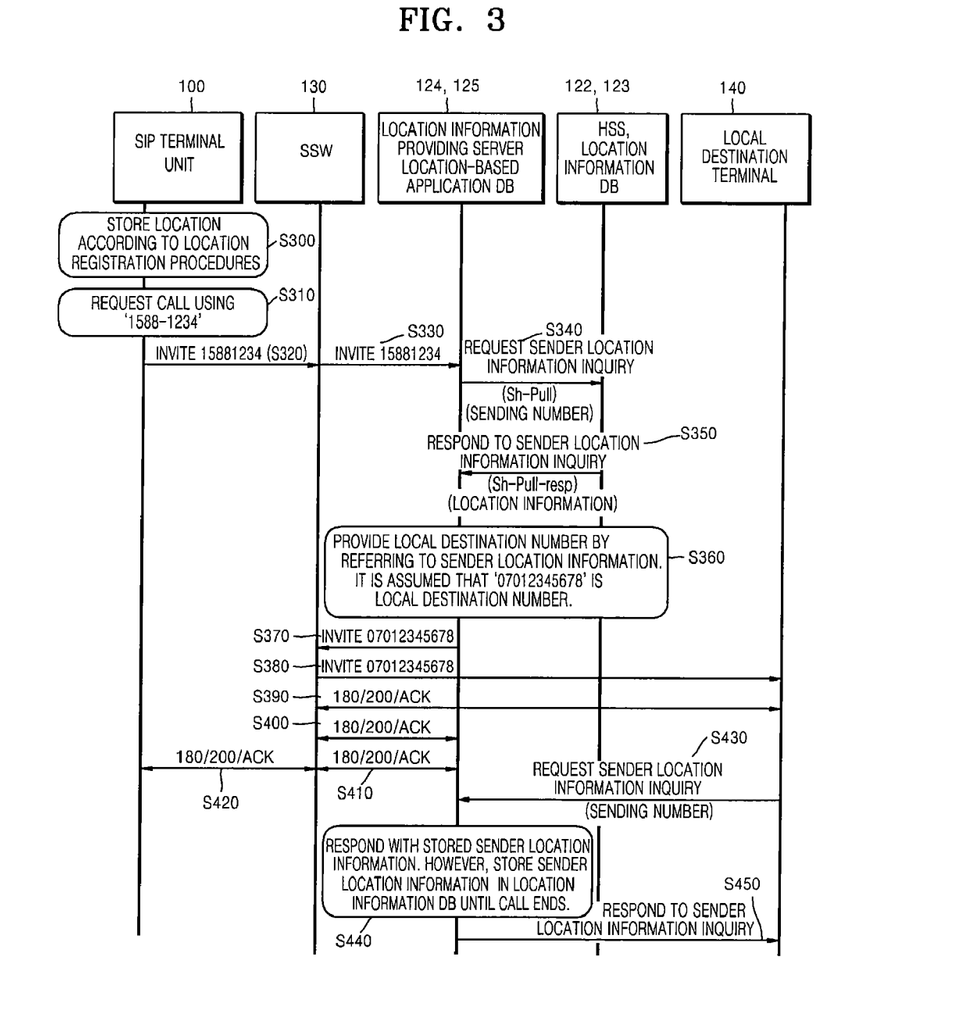
FIG. 3 is a signaling diagram of a process of providing short-distance routing and sender location information in response to a VoIP call request according to an embodiment of the present invention.

FIG. 3 is a signaling diagram of a process of providing short-distance routing and sender location information in response to a VoIP call request according to an embodiment of the present invention.

Referring to FIG. 3, using the procedures illustrated in FIG. 2 or other procedures, a location is stored according to the location registration procedures in operation S300.

It is assumed that the SIP terminal unit 100 requests a call using a destination number '1588-1234' in operation S310. The call is transmitted to the location information providing server 124 with the destination number '1588-1234' using a SIP message 'INVITE' in operations S320 and S330. The location information providing server 124 transmits a request of sender location information inquiry to the HSS 122 and receives the sender location information from the HSS 122 in operations S340 and S350.

The location information providing server 124 searches for a local destination number of a location corresponding to the sender location information by referring to the sender location information. If the local destination number is found, the location information providing server 124 requests a call using the local destination number in operation S360. It is assumed that '07012345678' is the local destination number.

The call request INVITE message is transmitted to the local destination terminal 140 via the SSW 130 in operations S370 and S380. If a recipient receives the call, other SIP messages are transmitted to the SIP terminal unit 100 in order to set the call in operations S390, S400, S410, and S420.

The local destination terminal 140 requests sender location information inquiry from the location information providing server 124 in order to obtain location information of a user in operation S430. The location information providing server 124 responds with the stored sender location information. However, in operation S440, the location information providing server 124 stores the sender location information in the location information DB 123 until the call ends.

The location information providing server 124 responds to the sender location information inquiry in operation S450. In this case, not only the sender location information but also a service provider and additional information according to service agreements may be provided.

Figure 4:
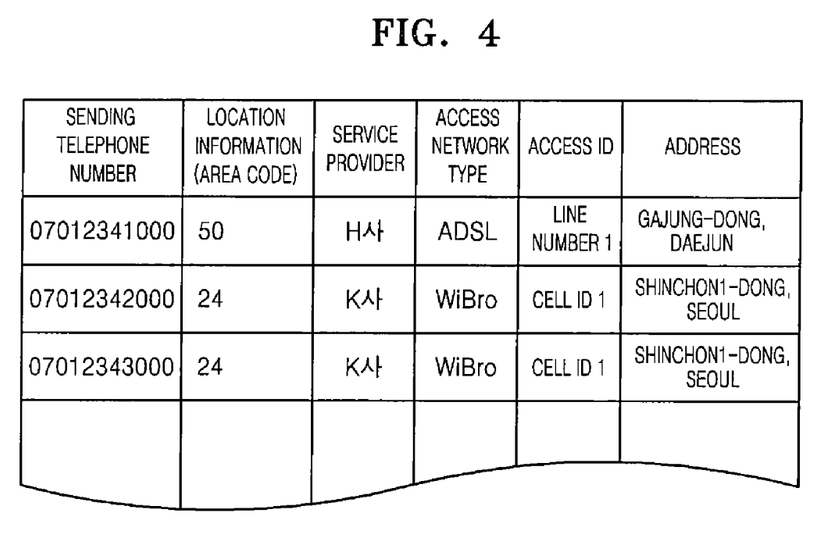
FIG. 4 illustrates location information of sender telephone numbers in a location information Database (DB) according to an embodiment of the present invention.

FIG. 4 illustrates location information of sender telephone numbers in the location information DB 123 illustrated in FIG. 1, according to an embodiment of the present invention.

FIG. 4 shows sender telephone numbers, current location information (area codes), service providers, access network types, access IDs, and addresses, which are stored in the location information DB 123. As illustrated in FIG. 4, each sender telephone number matches each piece of the current location information in the form of a lookup table.

Figure 5:
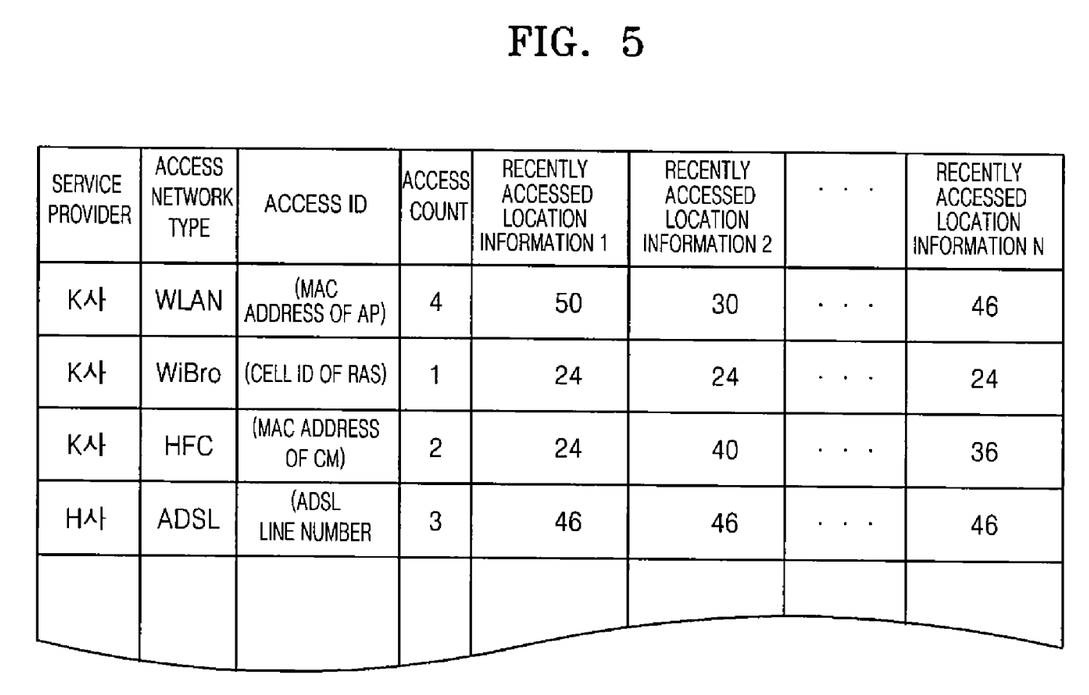
FIG. 5 illustrates information stored by mapping an ID of a device to recently accessed location information in an access network of a location information DB according to an embodiment of the present invention.

FIG. 5 illustrates information stored by mapping an ID of a device to recently accessed location information in an access network of the location information DB 123 illustrated in FIG. 1, according to an embodiment of the present invention.

FIG. 5 shows a service provider field, an access network type field, an access ID field, an access count field, recently accessed location information 1 to N fields. A stored location information history can be read as desired. If the history is accumulated a lot, relevant information is provided to a user, and thus, when the user changes a location, the user can select new location information without newly inputting the new location information.

Figure 6:
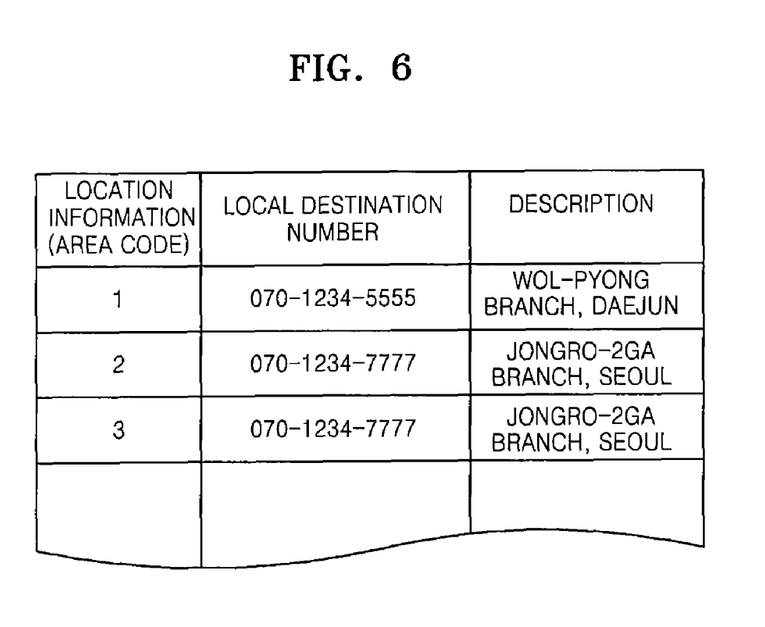
FIG. 6 illustrates information stored by mapping location information to destination numbers in a location-based application DB according to an embodiment of the present invention.

FIG. 6 illustrates information stored by mapping location information to destination numbers in the location-based application DB 125 illustrated in FIG. 1, according to an embodiment of the present invention.

FIG. 6 shows local destination numbers according to area codes of a service provider joined in a location-based application service (e.g., a representative number). As illustrated in FIG. 6, if a single branch covers several areas, several pieces of location information can have the same local destination number.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, according to the present invention, unlike a conventional terminal of which a telephone number and address are registered every time, since location management is provided using access information, a location of a subscriber can be easily provided.

In addition, since location information is provided using an HSS of the $3^{rd}$ Generation Partnership Project (3GPP), the location information can be used in a plurality of location-based application services.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A system for performing location management using a Home Subscriber Server (HSS) in a Voice over Internet Protocol (VoIP) service, the system comprising:

a Session Initiation Protocol (SIP) terminal unit configured to send and receive a SIP call, by which a VoIP telephone can be used, by being connected to a broadband VoIP network;

an HSS controller having a Database (DB) storing an Identification (ID) of a device, which the SIP terminal unit initially accesses according to an access network to which the SIP terminal unit is connected in the broadband VoIP network, location information of the SIP terminal unit, which contains a location code and an address of the device, and location information of a destination terminal to which the SIP terminal unit is to connect; and a Call Session Control Function (CSCF) controller connecting the SIP terminal unit and the destination terminal in a VoIP telephone service using the location information stored in the HSS controller in the broadband VoIP network, wherein the HSS controller comprises:

an HSS having a location information DB storing the ID of the device, which the SIP terminal unit initially accesses, and the location information of the SIP terminal unit, which contains a location code and the address of the device;

a location information providing server having a location-based application DB storing the location information of the destination terminal to which the SIP terminal unit is to connect; and a location registration server configured to receive the address of the SIP terminal unit from the SIP terminal unit or the ID of the device, which the SIP terminal unit initially accesses, and transmit the address of the SIP terminal unit to the HSS, wherein when information of the destination terminal to which the SIP terminal unit is to connect does not include location information, the location information providing server is configured to locate a local destination number of the destination terminal by referring to the location information of the SIP terminal unit stored in the HSS having the location information DB.

2. The system of claim 1, wherein the access network to which the SIP terminal unit is connected in the broadband VoIP network and the ID of the device, which the SIP terminal unit initially accesses according to the access network, are a Wireless Local Area Network (WLAN) and a Media Access Control (MAC) address of an Access Point (AP), respectively, a Wireless Broadband (WiBro) network and a cell ID of a Radio Access system (RAS), respectively, a Hybrid Fiber Coaxial (HFC) cable and a MAC address of a Cable Modem (CM), respectively, or an Asymmetric Digital Subscriber Line (ADSL) and a line number, respectively.

* * * * *